United States Patent

Ueyama

(10) Patent No.: US 9,591,231 B2
(45) Date of Patent: Mar. 7, 2017

(54) IMAGE PROCESSING APPARATUS CAPABLE OF PROPERLY EMPHASIZING DIFFERENCES IN BRIGHTNESS BETWEEN BRIGHT SPOTS, IMAGE PROCESSING METHOD, AND STORAGE MEDIUM

(71) Applicant: CANON KABUSHIKI KAISHA, Tokyo (JP)

(72) Inventor: Teruhiko Ueyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/887,854

(22) Filed: Oct. 20, 2015

(65) Prior Publication Data

US 2016/0117803 A1 Apr. 28, 2016

(30) Foreign Application Priority Data

Oct. 22, 2014 (JP) ................. 2014-215434

(51) Int. Cl.
- *G06K 9/00* (2006.01)
- *H04N 5/235* (2006.01)
- *G06T 5/00* (2006.01)

(52) U.S. Cl.
CPC ........... *H04N 5/2352* (2013.01); *G06T 5/002* (2013.01); *G06T 5/008* (2013.01); *H04N 5/2351* (2013.01); *G06T 2207/20021* (2013.01); *G06T 2207/20192* (2013.01)

(58) Field of Classification Search
CPC ...... G06T 5/00; G06T 7/0085; G06T 2207/20192; G06T 2207/20148; H04N 5/2351; H04N 5/2352
See application file for complete search history.

(56) References Cited

U.S. PATENT DOCUMENTS

| 2005/0093992 A1* | 5/2005 | Fukumoto ............... G06T 7/408 348/222.1 |
| 2010/0328535 A1* | 12/2010 | Okui ........................ G09G 3/20 348/578 |
| 2011/0013039 A1* | 1/2011 | Aisaka .................. H04N 5/142 348/222.1 |

(Continued)

FOREIGN PATENT DOCUMENTS

JP 2013-025650 A 2/2013

OTHER PUBLICATIONS

Strojnik, Marija. "Experimental verification of a star field identification algorithm." Optical Engineering 33.4 (1994): 1120-1124.*

(Continued)

*Primary Examiner* — Li Liu
(74) *Attorney, Agent, or Firm* — Cowan, Liebowitz & Latman, P.C.

(57) ABSTRACT

A technique that makes it possible to obtain a natural photographed image which does not give a feeling of strangeness and emphasizes differences in brightness between bright stars and low-brightness stars, without depending on a photographic scene. In a case where photographing the starry sky, the number of bright spots is detected from a picked-up image, and image processing performed on the picked-up image is controlled to at least blurring processing or edge emphasis processing or neither the blurring processing nor the edge emphasis processing, according to the number of detected bright spots.

17 Claims, 11 Drawing Sheets

(56) References Cited

U.S. PATENT DOCUMENTS

2013/0182002 A1* 7/2013 Macciola .............. H04N 1/387
  345/589

OTHER PUBLICATIONS

Sohrabi, S. H., and AA Beheshti Shirazi. "A novel, smart and fast searching method for star pattern recognition using star magnitudes." Image and Vision Computing New Zealand (IVCNZ), 2010 25th International Conference of. IEEE, 2010.*

* cited by examiner

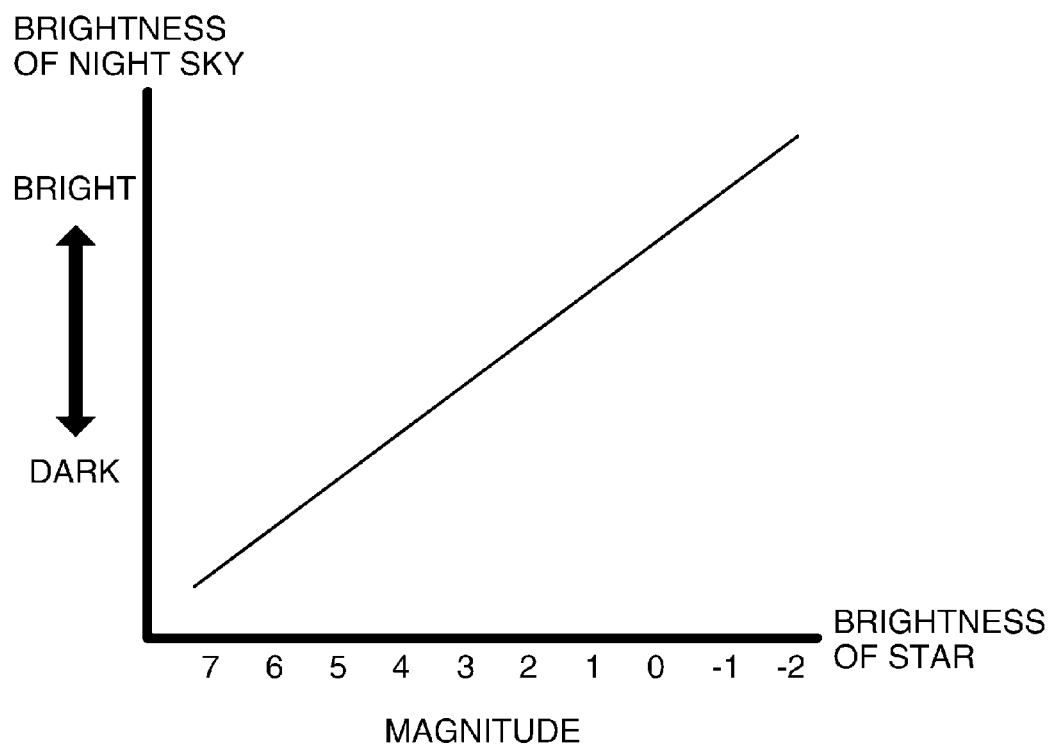

UNPROCESSED

BLURRING
PROCESSED

EDGE EMPHASIS
PROCESSED

UNPROCESSED

EDGE EMPHASIS PROCESSED

BLURRING PROCESSED

IMAGE PROCESSING APPARATUS CAPABLE OF PROPERLY EMPHASIZING DIFFERENCES IN BRIGHTNESS BETWEEN BRIGHT SPOTS, IMAGE PROCESSING METHOD, AND STORAGE MEDIUM

BACKGROUND OF THE INVENTION

Field of the Invention

The present invention relates to an image processing apparatus that is capable of properly emphasizing differences in brightness between bright spots, an image processing method, and a storage medium, and more particularly to a technique that is applied to photographing of the starry sky.

Description of the Related Art

In recent years, a technique of reducing noise in a digital camera has been improved, and this makes it possible to obtain a high-quality image also in high-sensitivity photographing. As a consequence, digital cameras are equipped with a function which makes it possible to easily perform celestial photographing which has been conventionally difficult to be performed even in a state where a digital camera is fixed.

In the case of photographing the starry sky, in a suburb, a mountain area or the like, where there are few lights in the surrounding area, it is possible to photograph stars ranging from bright stars to low-brightness stars, such as faint stars, because the sky is dark. However, in a city area or a residential area, the sky is bright due to e.g. an influence of light pollution, and hence it is difficult to perform celestial photographing such that a large number of stars are included in a photographed image. To meet a demand for photographing a large number of stars even in the night sky under the influence of light pollution, there has been proposed a method of emphasizing a low-brightness star by performing image processing for emphasizing edges of a spot which is higher in luminance than its surrounding area. As such star emphasizing processing, there has been proposed a method of automatically determining a weighting amount of a threshold value for use in binarization for identifying a point light source area from an image area, and detecting bright spots included in the image with high accuracy by using the determined weighting amount (see Japanese Patent Laid-Open Publication No. 2013-25650).

According to the above-mentioned star emphasis processing, when photographing the night sky in a bright place under the influence of light pollution or the like, it is possible to emphasize a low-brightness star by performing edge emphasis for pixels higher in luminance than its surrounding area. However, when photographing the night sky in a dark place, a photographed image becomes an unnatural one because all stars are emphasized, and further it is impossible to show bright stars in an emphasized manner out of a large number of stars in the photographed image.

SUMMARY OF THE INVENTION

The present invention provides a technique that makes it possible to obtain a natural photographed image which does not give a feeling of strangeness and emphasizes differences in brightness between bright stars and low-brightness stars, without depending on a photographic scene.

In a first aspect of the present invention, there is provided an image processing apparatus comprising a bright spot detection unit configured to detect the number of bright spots from an image picked up by an image pickup unit, a blurring processing unit configured to perform blurring processing as image processing on the image picked up by the image pickup unit, an edge emphasis processing unit configured to perform edge emphasis processing as the image processing on the image picked up by the image pickup unit, and a control unit configured to control the image processing performed by the blurring processing unit and the edge emphasis processing unit, wherein the control unit controls the image processing performed on the image picked up by the image pickup unit to at least the blurring processing or the edge emphasis processing or neither of the blurring processing and the edge emphasis processing, according to the number of bright spots detected by the bright spot detection unit.

In a second aspect of the present invention, there is provided an image processing apparatus comprising a bright spot detection unit configured to detect the number of bright spots from an image picked up by an image pickup unit, an edge emphasis processing unit configured to perform edge emphasis processing on the image picked up by the image pickup unit, and a control unit configured to control the image processing performed by the edge emphasis processing unit, wherein the control unit controls the edge emphasis processing performed on the image picked up by the image pickup unit by the edge emphasis processing unit according to the number of bright spots detected by the bright spot detection unit.

In a third aspect of the present invention, there is provided an image processing method performed by a computer, comprising detecting the number of bright spots from an image, perform blurring processing as image processing on the image, performing edge emphasis processing as the image processing on the image, and controlling the image processing performed on the image, according to the number of bright spots detected by said detecting, wherein said controlling includes controlling the image processing performed on the image picked up by the image pickup unit to at least the blurring processing or the edge emphasis processing or neither of the blurring processing and the edge emphasis processing, according to the number of bright spots detected by said detecting.

In a fourth aspect of the present invention, there is provided an image processing method performed by a computer, comprising performing on an image, binarization processing using a first threshold value, and binarization processing using a second threshold value which is smaller than the first threshold value, detecting the number of bright spots on an image subjected to binarization processing using the first threshold value as a first number of bright spots, and the number of bright spots on an image subjected to binarization processing using the second threshold value as a second number of bright spots, respectively, and controlling image processing performed on the image according to the first number of bright spots and the second number of bright spots, wherein said controlling includes controlling, according to the first number of bright spots and the second number of bright spots, whether to perform the blurring processing or the edge emphasis processing or neither the blurring processing nor the edge emphasis processing.

In a fifth aspect of the present invention, there is provided a non-transitory computer-readable storage medium storing a computer-executable program for executing an image processing method, wherein the image processing method comprises detecting the number of bright spots from an image, perform blurring processing as image processing on the image, performing edge emphasis processing as the image processing on the image, and controlling the image processing performed on the image, according to the number of bright spots detected by said detecting, wherein said controlling includes controlling the image processing performed on the image picked up by the image pickup unit to at least the blurring processing or the edge emphasis processing or neither of the blurring processing and the edge emphasis processing, according to the number of bright spots detected by said detecting.

In a sixth aspect of the present invention, there is provided a non-transitory computer-readable storage medium storing a computer-executable program for executing an image processing method, wherein the image processing method comprises performing, on an image, binarization processing using a first threshold value, and binarization processing using a second threshold value which is smaller than the first threshold value, detecting the number of bright spots on an image subjected to binarization processing using the first threshold value as a first number of bright spots, and the number of bright spots on an image subjected to binarization processing using the second threshold value as a second number of bright spots, respectively, and controlling image processing performed on the image according to the first number of bright spots and the second number of bright spots, wherein said controlling includes controlling, according to the first number of bright spots and the second number of bright spots, whether to perform the blurring processing or the edge emphasis processing or neither the blurring processing nor the edge emphasis processing.

According to the present invention, it is possible to obtain a natural photographed image which does not give a feeling of strangeness and emphasizes differences in brightness between bright stars and low-brightness stars, without depending on a photographic scene.

Further features of the present invention will become apparent from the following description of exemplary embodiments (with reference to the attached drawings).

BRIEF DESCRIPTION OF THE DRAWINGS

FIG. 9 is a diagram showing a relationship between the brightness of the night sky as an object and the brightness of a star.

DESCRIPTION OF THE EMBODIMENTS

The present invention will now be described in detail below with reference to the accompanying drawings showing embodiments thereof. Here, an image pickup apparatus is described as an image processing apparatus according to an embodiment of the present invention.

Figure 1:
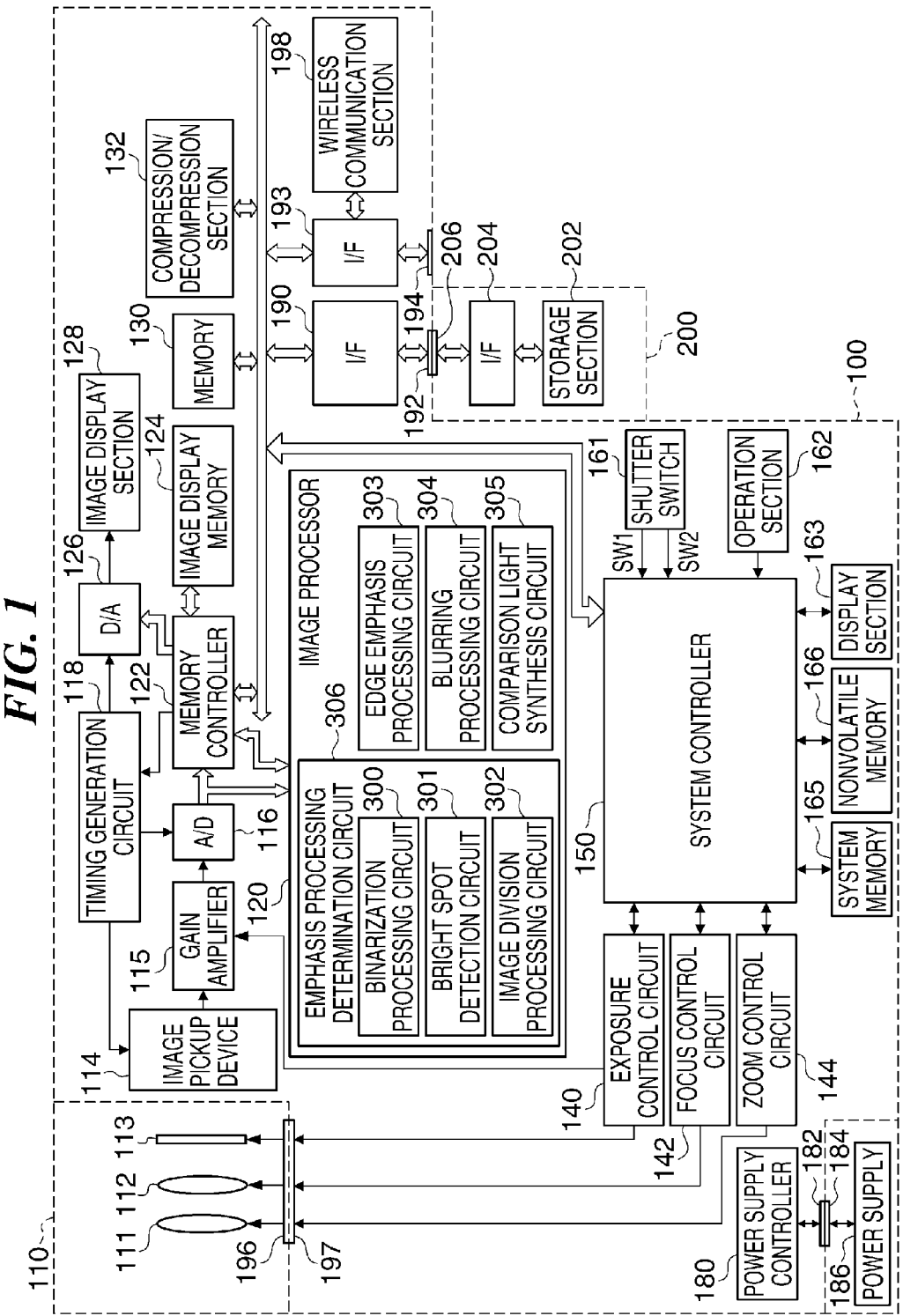
FIG. 1 is a schematic block diagram of an image pickup apparatus as an image processing apparatus according to an embodiment of the present invention.

FIG. 1 is a schematic block diagram of the image pickup apparatus, denoted by reference numeral 100, as the image processing apparatus according to the embodiment of the present invention. The image pickup apparatus 100 includes a lens unit 110, a connector 197, an image pickup device 114, a gain amplifier 115, an analog-to-digital converter (A/D converter) 116, a timing generation circuit 118, an image processor 120, and a memory controller 122. The image pickup apparatus 100 further includes an image display memory 124, a digital-to-analog converter (D/A converter) 126, an image display section 128, a memory 130, a compression/decompression section 132, an exposure control circuit 140, a focus control circuit 142, and a zoom control circuit 144.

The lens unit 110 includes a zoom lens 111, a focus lens 112, a diaphragm/shutter unit 113, and a connector 196. The lens unit 110 is detachably attached to a body of the image pickup apparatus 100. In a state where the lens unit 110 is attached to the body of the image pickup apparatus 100, the connector 196 is electrically connected to the connector 197 provided on the body of the image pickup apparatus 100. Control signals output from a system controller 150 are transmitted to the respective drive units (not shown) of the zoom lens 111, the focus lens 112, and the diaphragm/shutter unit 113, respectively, through the connectors 196 and 197. Thus, zooming, focusing, adjustment of the depth of field, and so on, desired by a photographer (user), are performed. The lens unit 110 may have a structure undetachable from the body of the image pickup apparatus 100.

The image pickup device 114 is an image sensor, such as a CCD sensor or a CMOS sensor. Light transmitted through the lens unit 110 from an object forms an optical image on the image pickup device 114, and the image pickup device 114 converts the formed optical image to an analog electric signal.

The analog electric signal output from the image pickup device 114 is sent to the gain amplifier 115. The gain amplifier 115 amplifies the signal level by multiplying the analog electric signal input thereto with a predetermined gain, and sends the amplified analog signal to the analog-to-digital converter 116. The analog-to-digital converter 116 converts the input analog electric signal to image data which is a digital signal, and sends the generated image data to the memory controller 122 and the image processor 120. The timing generation circuit 118 is controlled by the memory controller 122 and the system controller 150 to supply a clock signal and a control signal to the image pickup device 114, the analog-to-digital converter 116, and the digital-to-analog converter 126.

The image processor 120 performs predetermined pixel interpolation processing and color conversion processing on image data output from the analog-to-digital converter 116 or image data output from the memory controller 122. Further, the image processor 120 performs predetermined computation processing on the picked-up image data, and then supplies computation results to the system controller 150. The system controller 150 sends control signals for carrying out TTL (through-the-lens) AF (autofocus) processing and AE (auto exposure) processing to the exposure control circuit 140 and the focus control circuit 142 based on the computation results acquired from the image processor 120. Further, the image processor 120 performs predetermined computation processing on the picked-up image data, and carries out TTL AWB (auto white balance) processing based on the obtained computation results. The image processor 120 has a configuration characterized by a feature for performing image processing in photographing the starry sky, and details thereof will be described hereinafter.

The memory controller 122 controls the analog-to-digital converter 116, the timing generation circuit 118, the image processor 120, the image display memory 124, the digital-to-analog converter 126, the memory 130, and the compression/decompression section 132. The image data output from the analog-to-digital converter 116 is written in the image display memory 124 or the memory 130 via the image processor 120 and the memory controller 122 or via the memory controller 122 alone.

The image data for display, written in the image display memory 124, is displayed on the image display section 128, such as a liquid crystal display (LCD) or an organic EL display, via the digital-to-analog converter 126. A so-called electronic finder function can be realized by sequentially displaying the picked-up image data on the image display section 128.

The memory 130 is a storage unit for storing image data of photographed still images and moving images, and has a storage capacity large enough to store a predetermined number of still images or a moving image recorded for a predetermined time period, so as to make it possible to have a large amount of images written therein at high speed. Further, the memory 130 can also be used as a work area for the system controller 150. The memory 130 also functions as a storage unit for storing relative information of the focus control circuit 142 to the operation of the zoom control circuit 144 as a scaling unit configured to change the magnification of an object image. Further, the memory 130 functions as a work area and a storage area for use in various processing operations performed by the image processor 120 (binarization processing, bright spot detection processing, image dividing processing, edge emphasis processing, blurring processing, comparison light synthesis processing), described hereinafter. The compression/decompression section 132 reads image data stored in the memory 130, compresses or decompresses the image data using e.g. adaptive discrete cosine transformation (ADCT), and writes the processed image data in the memory 130.

The system controller 150 controls the overall operation of the image pickup apparatus 100. The exposure control circuit 140 controls the shutter unit 113 having a diaphragm function and a shutter function, and the gain amplifier 115 that sets the image pickup sensitivity, under the control of the system controller 150. The focus control circuit 142 controls focusing of the focus lens 112 under the control of the system controller 150. The zoom control circuit 144 controls zooming of the zoom lens 111 under the control of the system controller 150.

The image pickup apparatus 100 further includes a shutter switch 161, an operation section 162, a display section 163, a system memory 165, a nonvolatile memory 166, a power supply controller 180, connectors 182 and 184, and a power supply 186. Further, the image pickup apparatus 100 is provided with interfaces (I/F) 190 and 193, connectors 192 and 194, a wireless communication section 198, and a storage medium 200, and the storage medium 200 includes a storage section 202, an interface (I/F) 204, and a connector 206.

The system memory 165 stores constants and variables for use in operation of the system controller 150, programs, and so forth. The display section 163 includes a liquid crystal display device and a speaker for notifying the user of an operating state, a message, and so forth, using characters, images, voices, etc., according to execution of the program by the system controller 150. The display section 163 is arranged at one or a plurality of locations at which the photographer can easily view the display in the vicinity of the operation section 162 of the image pickup apparatus 100. Items displayed on the liquid crystal display device of the display section 162 include single-shot/continuous-shot photographing, self-timer photographing, a compression ratio, the number of stored pixels, the number of stored images, the remaining number of photographable images, a shutter speed, an aperture value, exposure correction, red-eye reduction, macro photographing, buzzer setting, a battery remaining charge, and so forth. The nonvolatile memory 166 is e.g. a flash ROM for storing data in an electrically erasable and recordable manner, and stores various setting information of the image pickup apparatus 100, etc.

The operation section 162 is formed of buttons and switches for inputting various operation instructions to the system controller 150. A shutter switch SW1 of the shutter switch 161 is turned on when a shutter button (not shown) is half pressed, to thereby instruct the system controller 150 to start photographing preparation operation including AF processing, AE processing, and AWB processing. A shutter switch SW2 of the shutter switch 161 is turned on when the shutter button is fully pressed to thereby instruct the system controller 150 to perform a sequence of processing operations from the image pickup operation by the image pickup device 114 to storage of image data of a photographed image.

The operation section 162 further includes a menu button, a set button, a macro button, a multi-screen reproduction page change button, a strobe setting button, a single shot/continuous shot/self-timer changeover button, and a touch panel provided on the image display section 128. Further, the operation section 162 includes a dial for setting a photographing mode (an auto mode, a program mode, a celestial object (starry sky) photographing mode, a night scene mode, a child photographing mode, a firework photographing mode, etc.) and a button for changing an item or an image displayed on the menu (four-way button for changing the item or image in upper, lower, right, and left directions).

The power supply controller 180 is formed of a battery detection circuit, a DC-DC converter, and a switch circuit for use in switching between blocks to be supplied with electric power. Further, the power supply controller 180 detects whether or not a power source is connected, such as whether or not a battery is mounted, a type of the battery, a remaining charge of the battery, and a power supply voltage, and controls the DC-DC converter based on detection results and instructions from the system controller 150 to supply a required voltage to each of the components including the storage medium 200 over a required time period. The power supply 186 includes e.g. a primary battery, such as an alkaline battery or a lithium battery, or a secondary battery, such as an NiCd battery, an NiMH battery, or an Li battery, as well as an AC adapter. The power supply controller 180 and the power supply 186 are connected via the connectors 182 and 184.

The interface 190 and the connector 192 are used to enable communication between the storage medium 200 and the system controller 150, and use those compliant with the standard of the storage medium 200 to be connected. The interface 193 and the connector 194 are equipped for use in connecting to and communicating with other devices. The other device is connected to the connector 194 directly or via a communication cable, and communication is performed between the connected other device and the system controller 150. The wireless communication section 198 is connected, inside the image pickup apparatus 100, to the interface 193, and enables wireless communication with other devices. The storage medium 200 includes the storage section 202 which is e.g. a semiconductor memory or a magnetic disk, the interface 204 for use in enabling communication with the image pickup apparatus 100, and the connector 206 for use in connecting to the image pickup apparatus 100.

Next, the characterizing feature of the configuration of the image processor 120 will be described in detail. The image processor 120 includes an emphasis processing determination circuit 306 including a binarization processing circuit 300, a bright spot detection circuit 301, and an image division processing circuit 302, an edge emphasis processing circuit 303, a blurring processing circuit 304, and a comparison light synthesis circuit 305.

The binarization processing circuit 300 binarizes the whole picked-up image or a partial area of the image using a designated threshold value level. The bright spot detection circuit 301 detects the number of bright spots, such as spot light sources, each of which is an object having a predetermined or smaller number of pixels each having a predetermined or higher luminance value, from the whole picked-up image or a partial area of the image. The image division processing circuit 302 divides the whole picked-up image or the partial area of the image into a plurality of image areas which have a predetermined size or different sizes, and cuts out the image on a divided image area-by-divided image area basis (hereinafter referred to as the "divided area"). The edge emphasis processing circuit 303 performs edge emphasis processing on the whole picked-up image or the partial area of the image cut out by the image division processing circuit 302. The blurring processing circuit 304 performs blurring processing for obtaining the soft-focus effect on the whole picked-up image or the partial area of the image cut out by the image division processing circuit 302. The comparison light synthesis circuit 305 performs comparison light synthesis in which the pixel levels of pixels at respective corresponding positions in a plurality of picked-up images are compared with each other to select only a pixel having the highest level, and pixels thus selected for each position are synthesized into one image.

Hereafter, a description will be given of image processing performed on a picked-up image obtained by photographing the starry sky (hereinafter referred to as the "starry sky image") by using the image pickup apparatus 100. First, a relationship between the brightness of the night sky and the brightness of a star will be described.

FIG. 9 is a diagram showing the relationship between the brightness of the night sky and the brightness of a star. The brightness of a star is generally expressed by the magnitude number, and for example, a change in magnitude of five equates to a change in brightness of 100 times. That is, a change in magnitude of one equates to a change in brightness by a factor of the fifth root of 100. On the other hand, in a case where the exposure for photographing is expressed by the number of steps, for example, a change in step number of five equates to a change in brightness of thirty-two times, and hence a change in step number of one equates to a change in brightness by a factor of the first power of two.

In FIG. 9, the relationship between the brightness of the night sky and the brightness of a star is expressed by a log-log scale, and can be expressed by a linear line representing the positive proportional relationship. This explains that in a case where photographing is performed with proper exposure, as the brightness of the night sky becomes lower, the magnitude number of a star which can be photographed increases. That is, this indicates that when the night sky is bright, a star which is low in brightness is buried in the brightness of the sky, and becomes unnoticeable. That is, when the bright night sky is photographed, a small number of stars are photographed, whereas when the dark night sky is photographed, a large number of stars including low-brightness stars can be photographed by increasing the exposure. For this reason, by performing star emphasis processing according to the number of stars included in the picked-up image of the starry sky, it becomes possible to easily photograph a natural and impact-filled image in which the differences in brightness between bright stars and low-brightness stars are emphasized. Specific examples will be described with reference to FIGS. 10A to 10C, and FIGS. 11A to 11C.

Figure 10A:
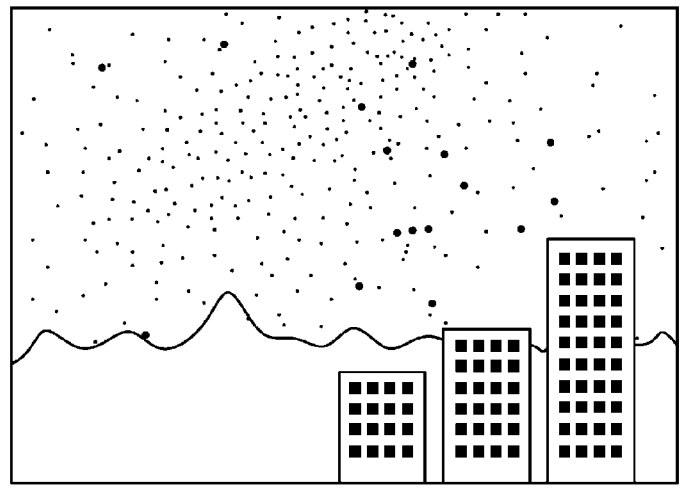
FIGS. 10A to 10C are diagrams each showing an example of a starry sky image with a dark night sky and a large number of stars.
Figure 10B:
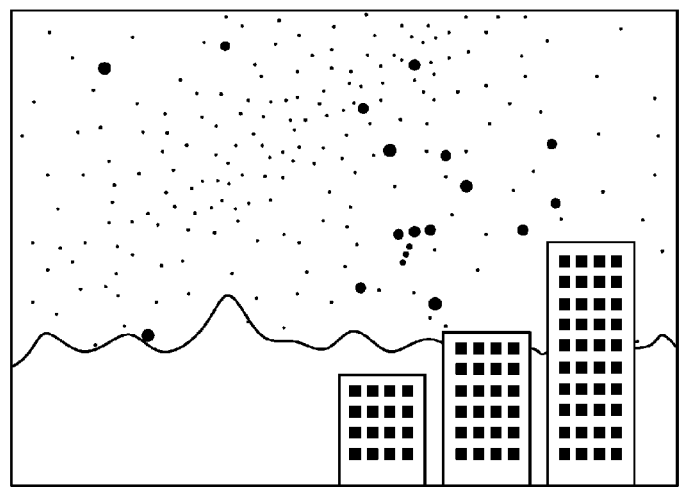
Figure 10C:
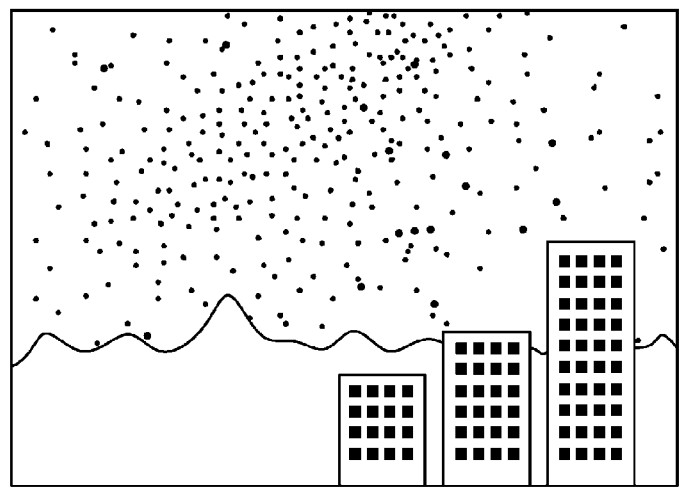

FIGS. 10A to 10C are diagrams each showing an example of a starry sky image including the dark night sky and a large number of stars. In FIGS. 10A to 10C, the images are shown in such a manner that brightness and darkness are inverted. That is, portions having the background color of paper represent dark portions, and black spots represent bright portions.

The image shown in FIG. 10A with a caption of "unprocessed" is a reference example, which shows a starry sky image obtained by normal photographing without performing special image processing, i.e. a starry sky image obtained by photographing the night sky without performing emphasis processing so as to photograph a large number of stars including low-brightness stars. In the starry sky image shown in FIG. 10A, bright stars are buried in the surrounding stars which are low in brightness, such as faint stars, and are made inconspicuous.

The image shown in FIG. 10C with a caption of "edge emphasis processed" is a reference example for the present embodiment, which shows a starry sky image obtained by performing edge emphasis processing on the starry sky image shown in FIG. 10A using the edge emphasis processing circuit 303. Even the low-brightness stars, such as the faint stars, are emphasized by the edge emphasis processing, whereby most of stars are brightly photographed, and hence the image is made an unnatural one in which it is difficult to distinguish the originally bright stars and the low-brightness stars.

The image shown in FIG. 10B with a caption of "blurring processed" is an example of image processing according to the present embodiment, which shows a starry sky image obtained by performing blurring processing on the starry sky image shown in FIG. 10A using the blurring processing circuit 304. By performing the blurring processing, each bright star is widely expanded and becomes conspicuous, and the low-brightness stars are blurred and made less conspicuous. By thus performing the blurring processing, it is possible to obtain a natural and impact-filled starry sky image in which the differences in brightness between the bright stars and the low-brightness stars are emphasized.

Figure 11A:
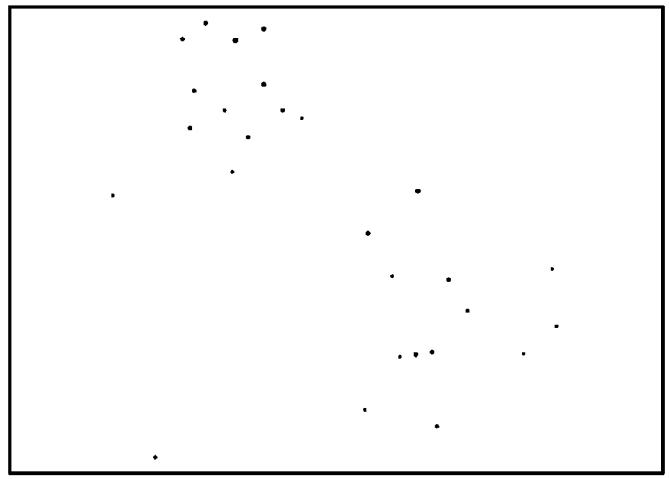
FIGS. 11A to 11C are diagrams each showing an example of a starry sky image with a bright night sky and a small number of stars.
Figure 11B:
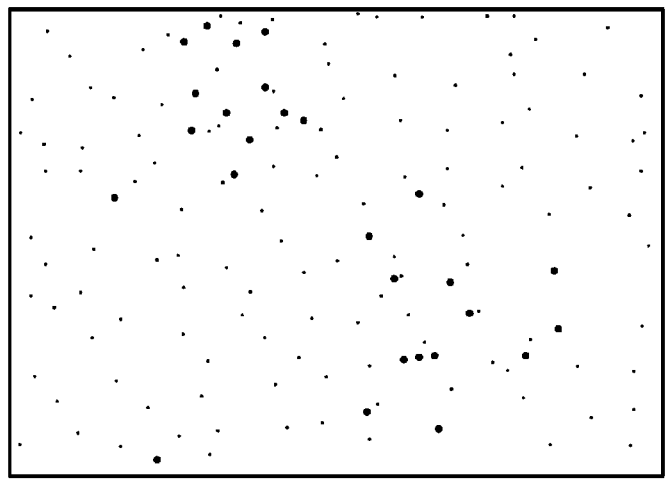
Figure 11C:
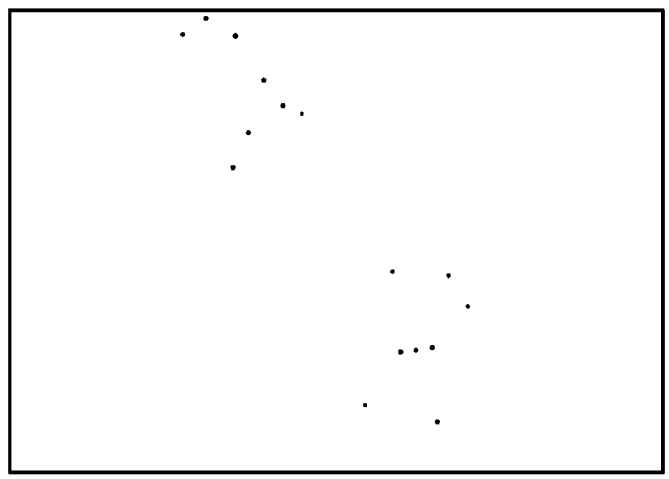

FIGS. 11A to 11C are diagrams each showing an example of a starry sky image including the bright night sky and a small number of stars. Also in FIGS. 11A to 11C, the images are shown in such a manner that brightness and darkness are inverted, similarly to FIGS. 10A to 10C.

The image shown in FIG. 11A with a caption of "unprocessed" is a reference example for the present embodiment, which shows a starry sky image obtained by normal photographing without performing special image processing, i.e. a starry sky image obtained by photographing the night sky without performing emphasis processing, in which few bright stars are included. The starry sky image shown in FIG. 11A includes very few low-brightness stars, and is an unimpressive starry sky image in which few bright stars having substantially the same brightness are sparsely included.

The image shown in FIG. 11C with a caption of "blurring processed" is a reference example for the present embodiment, which shows a starry sky image obtained by performing the blurring processing on the starry sky image shown in FIG. 11A using the blurring processing circuit 304. By performing the blurring processing, the low-brightness stars which appear to be small in the image shown in FIG. 11A are blurred and made inconspicuous, and as a result, the image becomes an unimpressive starry sky image as a whole, in which the number of stars is reduced.

The image shown in FIG. 11B with a caption of "edge emphasis processed" is an example of image processing according to the present embodiment, which shows a starry sky image obtained by performing the edge emphasis processing on the starry sky image shown in FIG. 11A using the edge emphasis processing circuit 303. By performing the edge emphasis processing, stars which are buried in the night sky and are low in brightness (which are difficult to be visually recognized in the starry sky image shown in FIG. 11A) are emphasized and clearly displayed, and even when photographing is performed in a place having much light pollution, such as a city area, a large number of stars are photographed without giving a feeling of strangeness.

In the present embodiment, as described with reference to FIGS. 10A to 10C, and FIGS. 11A to 11C, the emphasis processing to be performed on a starry sky image is automatically determined according to the brightness of the night sky and the number of stars, whereby it is possible to obtain the starry sky image in which the number of bright stars and low-brightness stars and the differences in brightness between the bright stars and the low-brightness stars are naturally expressed in an emphasized manner without giving a feeling of strangeness, as shown in FIGS. 10B and 11B.

The following description will be given of a first image pickup control process performed by the image pickup apparatus 100. The first image pickup control process performed by the image pickup apparatus 100 is executed in a case where the celestial object (starry sky) photographing mode is set on the operation section 162. The emphasis processing determination circuit 306 determines whether or not to carry out star emphasis processing on a starry sky image according to the number of bright spots detected from a picked-up starry sky image.

Figure 2:
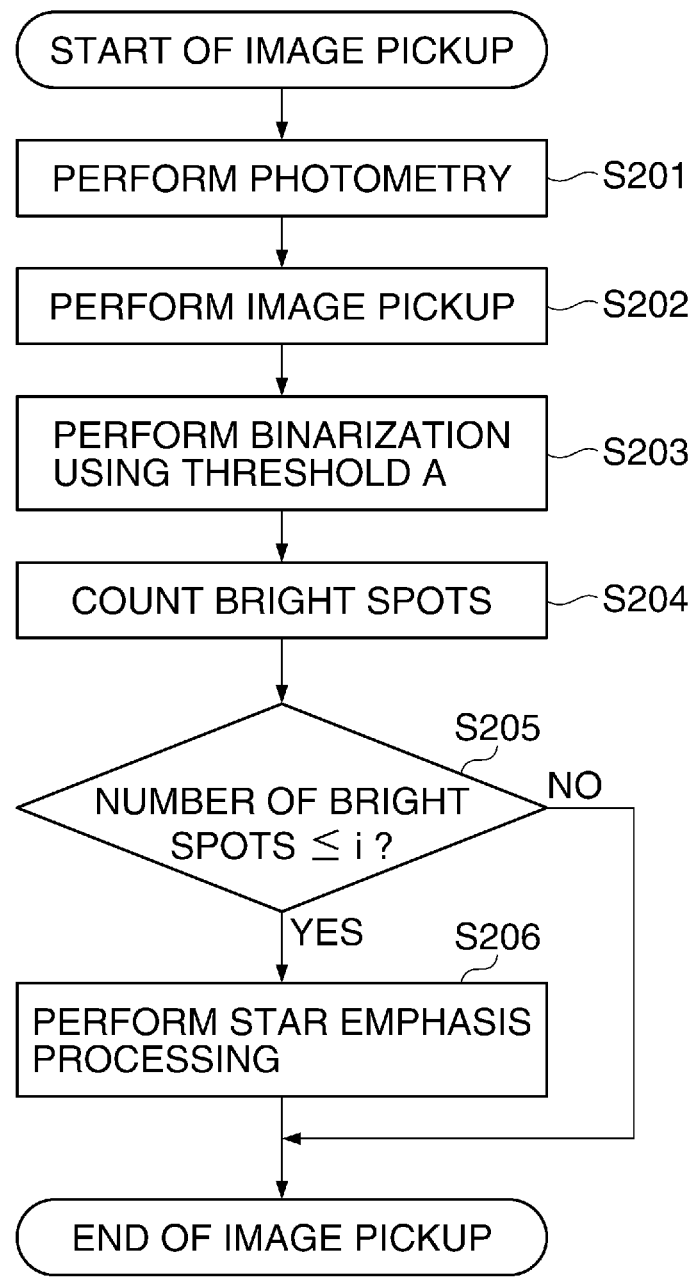
FIG. 2 is a flowchart of a first image pickup control process performed by the image pickup apparatus shown in FIG. 1.

FIG. 2 is a flowchart of the first image pickup control process performed by the image pickup apparatus 100, and shows the outline of processing performed by the emphasis processing determination circuit 306 for determining whether or not to carry out the star emphasis processing. In the first image pickup control process in FIG. 2, steps S201 and S202 are realized by the system controller 150 which loads a program stored in the system memory 165 into the memory 130. Steps S203 to S206 are realized by the image processor 120 including the emphasis processing determination circuit 306, which loads a program stored in a memory (not shown) inherently provided in the image processor 120 into the memory 130 as a work area under the control of the system controller 150. Note that the processing operations in the steps S203 to S206 are performed by an example of the image processing method according to the embodiment of the present invention.

In the step S201, the system controller 150 receives an image pickup start instruction via the operation section 162, and thereby starts photometry. After that, in the step S202, the system controller 150 determines a proper exposure value based on a result of photometry in the step S201, and performs an image pickup operation. Then, in the step S203, to detect a bright spot of a star, the emphasis processing determination circuit 306 causes the binarization processing circuit 300 to perform binarization processing using a threshold value A set in advance as a predetermined luminance level, for binarizing each spot in the starry sky image picked up in the step S202 according to whether or not the luminance level is not lower than the threshold value A.

Figure 3A:
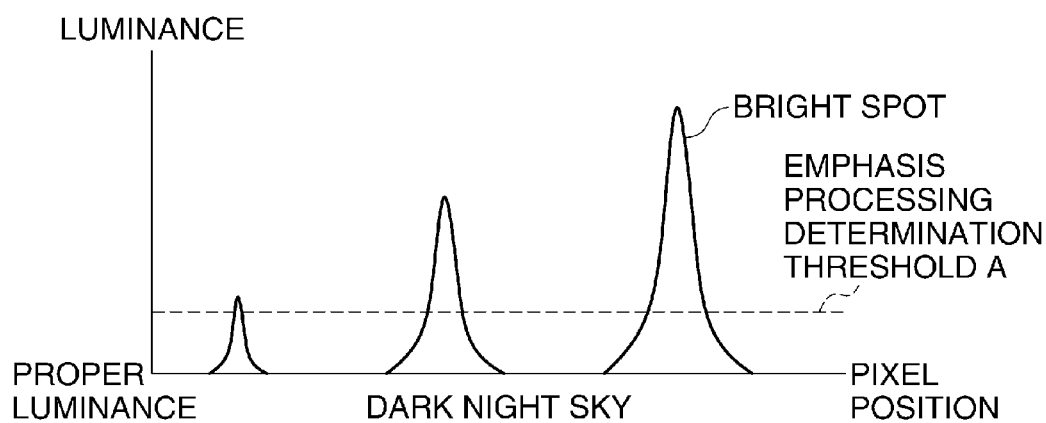
FIGS. 3A and 3B are diagrams useful in explaining binarization processing performed in a step of the process in FIG. 2.
Figure 3B:
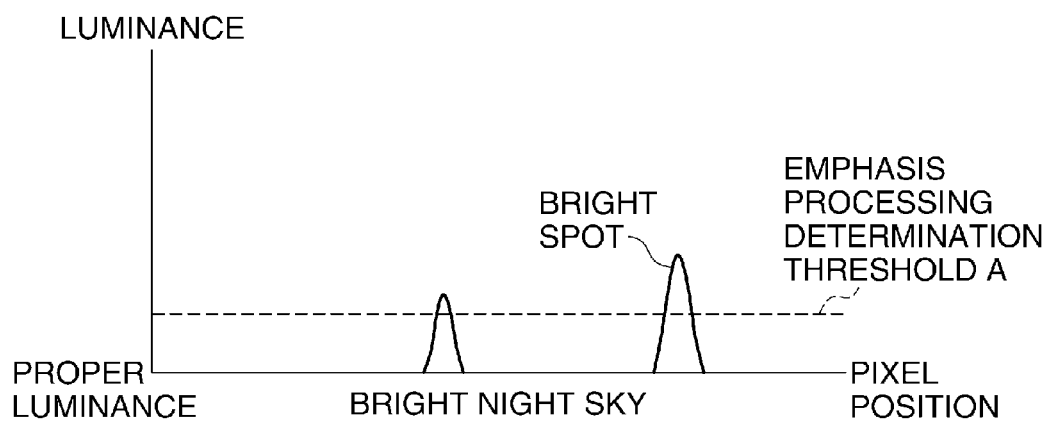

FIGS. 3A and 3B are diagrams useful in explaining the binarization processing performed in the step S203, and show examples of detection of bright spots which are not lower in luminance than the threshold value A, in respective images of the night sky photographed with proper exposure in cases where the night sky is bright and where the night sky is dark. FIG. 3A shows an example of the binarization processing performed when the dark night sky is photographed. When the dark night sky is photographed with proper exposure, the amount of exposure of stars increases, and even a low-brightness star is picked up as a bright spot which is sufficiently high in luminance level. Therefore, in the binarization processing, even a low-brightness star is detected as a bright spot which is not lower in luminance than the threshold value A. FIG. 3B shows an example of the binarization processing performed when the bright night sky is photographed. When the bright night sky is photographed with proper exposure, the amount of exposure to stars is insufficient, and even a bright star is photographed as a spot which is low in luminance level. Therefore, in the binarization processing, a low-brightness star is not detected as a bright spot which is not lower in luminance than the threshold value A.

From the above, when the number of bright spots which are not lower in luminance than the threshold value A is counted, the number of bright spots detected from the starry sky image of the dark night sky is larger than that detected from the starry sky image of the bright night sky. Therefore, the picked-up image is binarized by the binarization processing circuit 300 using the predetermined luminance threshold value A in the step S203, and the bright spots in the screen are detected by the bright spot detection circuit 301 in the subsequent step S204, whereby it is possible to determine according to the number of bright spots whether star emphasis processing should be performed for the photographed image.

Referring again to FIG. 2, in the step S204, the emphasis processing determination circuit 306 cause the bright spot detection circuit 301 to count the bright spots from the image data subjected to the binarization processing in the step S203. Then, in the step S205, the emphasis processing determination circuit 306 determines whether or not the number of bright spots detected in the step S204 is not larger than a predetermined value i which is suitable for star emphasis processing. If the number of bright spots is not larger than the predetermined value i (YES to the step S205), the emphasis processing determination circuit 306 proceeds to the step S206. On the other hand, if the emphasis processing determination circuit 306 determines that the number of bright spots is larger than the predetermined value i (NO to the step S205), the present process is terminated without performing the star emphasis processing. In the step S206, the emphasis processing determination circuit 306 determines to execute the star emphasis processing on the starry sky image obtained in the step S202, and the image processor 120 executes the star emphasis processing, followed by terminating the present process.

Figure 4:
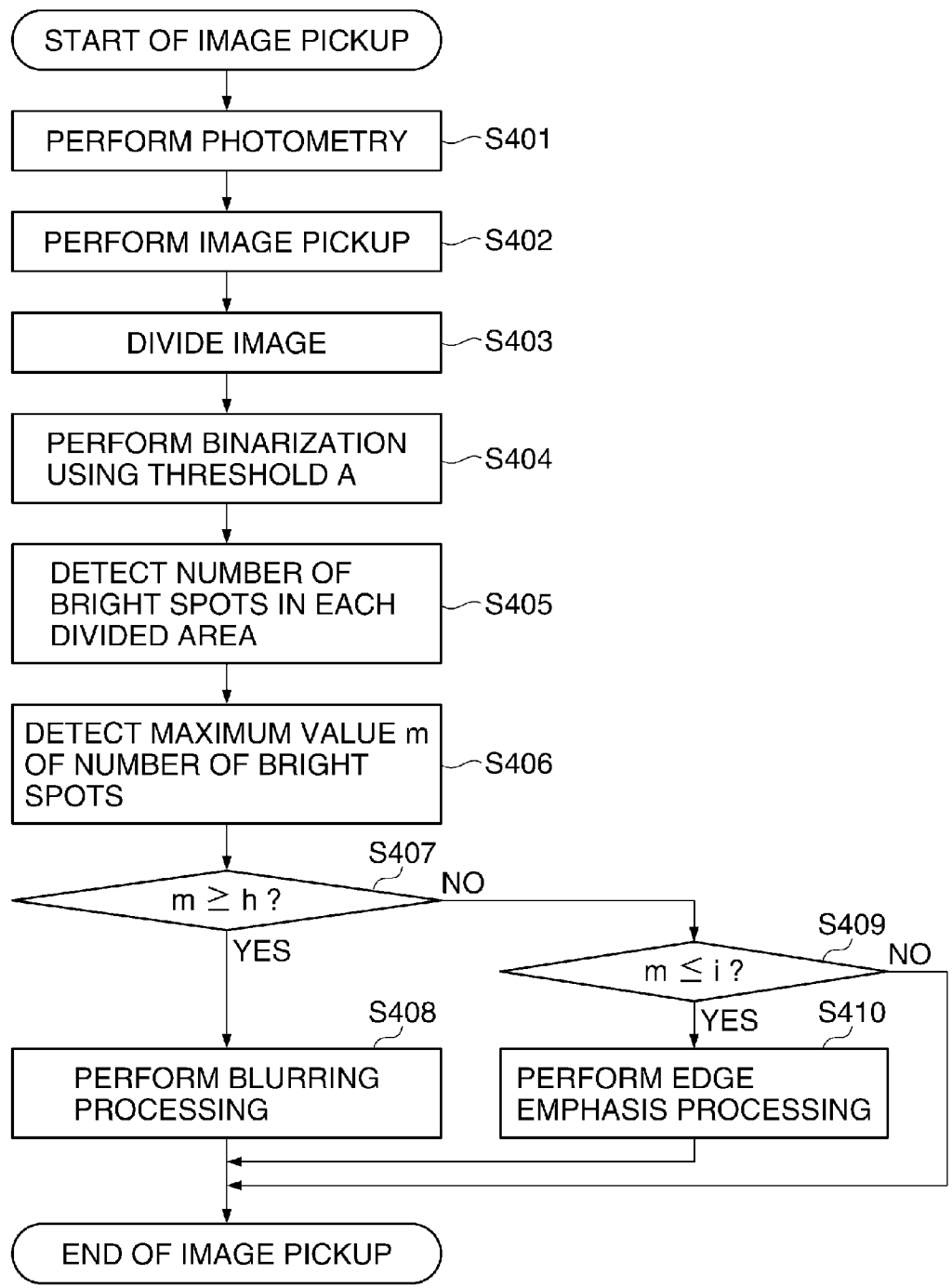
FIG. 4 is a flowchart of a process performed by an image processor of the image pickup apparatus, for performing proper emphasis processing on a photographed starry sky image.

The first image pickup control process performed by the image pickup apparatus 100, described with reference to FIG. 2, will be described in more detail based on the explanation given with reference to FIGS. 3A and 3B. FIG. 4 is a flowchart of the first image pickup control process including a process performed by the image processor 120 for performing proper emphasis processing based on a photographed starry sky image. Steps S401 and S402 are the same as the steps S201 and S202 of the process in FIG. 2, and hence description thereof is omitted. In a step S403, the emphasis processing determination circuit 306 causes the image division processing circuit 302 to perform image division processing for dividing the starry sky image picked up in the step S402 into a plurality of areas.

Figure 5:
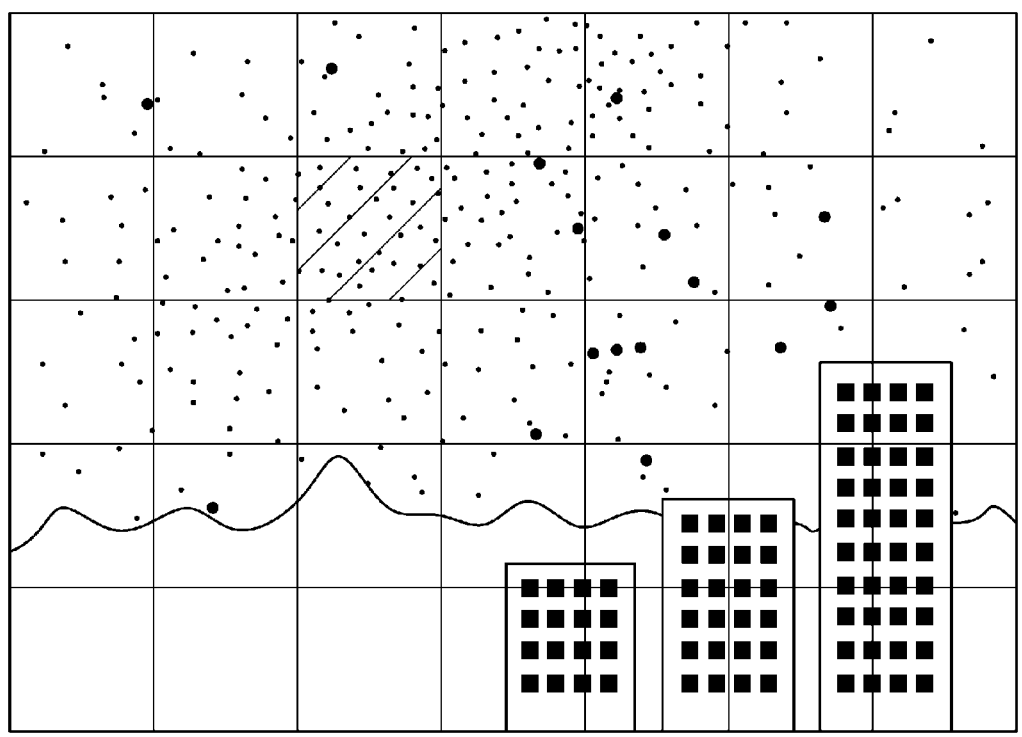
FIG. 5 is a schematic diagram useful in explaining processing performed by an image division processing circuit of the image pickup apparatus.

FIG. 5 is a schematic diagram useful in explaining processing performed by the image division processing circuit 302 for dividing the starry sky image into a plurality of areas and detecting a divided area which includes a largest number of bright spots. By dividing the starry sky image into the plurality of areas and then detecting the number of bright spots in each divided area, it is possible to grasp a starry sky area in the starry sky image, and estimate the density of stars in the divided area, based on the detected number of the bright spots.

In a step S404 following the step S403, in order to detect respective bright spots of stars from each divided area, the emphasis processing determination circuit 306 causes the binarization processing circuit 300 to perform binarization processing on the starry sky image using the threshold value A set in advance as the predetermined luminance level. In the following step S405, the emphasis processing determination circuit 306 causes the bright spot detection circuit 301 to detect the number of bright spots from each divided area subjected to the binarization processing in the step S403.

In a step S406, the emphasis processing determination circuit 306 detects the maximum value m of the numbers, detected in the step S405, of bright spots included in the plurality of divided areas. In the following step S407, the emphasis processing determination circuit 306 determines whether or not the maximum value m of the number of bright spots is not smaller than a predetermined value h (first predetermined value) suitable for blurring processing. If m≥h holds (YES to the step S407), the emphasis processing determination circuit 306 proceeds to a step S408, whereas if m<h holds (NO to the step S407), the emphasis processing determination circuit 306 proceeds to a step S409.

In the step S408, the blurring processing circuit 304 of the image processor 120 performs blurring processing on the starry sky image obtained in the step S402, followed by terminating the present process. In the step S409, the emphasis processing determination circuit 306 determines whether or not the maximum value m of the number of bright spots is not larger than the predetermined value i suitable for edge emphasis processing. If m≤i holds (YES to the step S409), the emphasis processing determination circuit 306 proceeds to a step S410, whereas if m>i holds (NO to the step S409), the present process is terminated without performing the star emphasis processing. Note that the predetermined values i and h has a relationship of i<h. In the step S410, the edge emphasis processing circuit 303 of the image processor 120 performs edge emphasis processing on the starry sky image obtained in the step S402, followed by terminating the present process.

In the present embodiment, as the number of bright spots used in the determination, the maximum value m of the number of bright spots is used so as to reduce the influence of the numbers of bright spots in divided areas of the bright night sky where it is difficult to find stars. However, this is not limitative, but an average value of the numbers of bright spots in the plurality of divided areas may be used, or any other suitable representative value, such as an intermediate value, may be used. Further, as candidates of an area from which the number of bright spots is to be determined, the areas may be narrowed down by user's designation, or by automatic detection, such as detection of divided areas in the upper half of the screen, or detection of divided areas of which the average luminance is not higher than a threshold value, and then an average value may be determined from the narrowed-down candidates. Further, although in the present embodiment, whether to perform blurring processing or edge emphasis processing, or perform neither blurring processing nor edge emphasis processing is selectively controlled according to the density of bright spots, this is not limitative, but only whether or not to perform edge emphasis processing may be controlled without performing blurring processing for emphasizing a star (bright spot emphasis) according to the density of bright sports (the number of bright spots in a divided area), or inversely, only whether or not to perform blurring processing may be controlled without performing edge emphasis processing.

Next, the following description will be given of a second image pickup control process performed by the image pickup apparatus 100. The second image pickup control process is performed by the image pickup apparatus 100 when the celestial object (starry sky) photographing mode is set on the operation section 162. In the second image pickup control process by the image pickup apparatus 100, to properly perform a different star emphasis processing according to photographing conditions, a picked-up image is binarized using a threshold value suitable for each emphasis processing, and the suitable emphasis processing is performed based on the number of bright spots detected from the image binarized using the threshold value.

Figure 6:
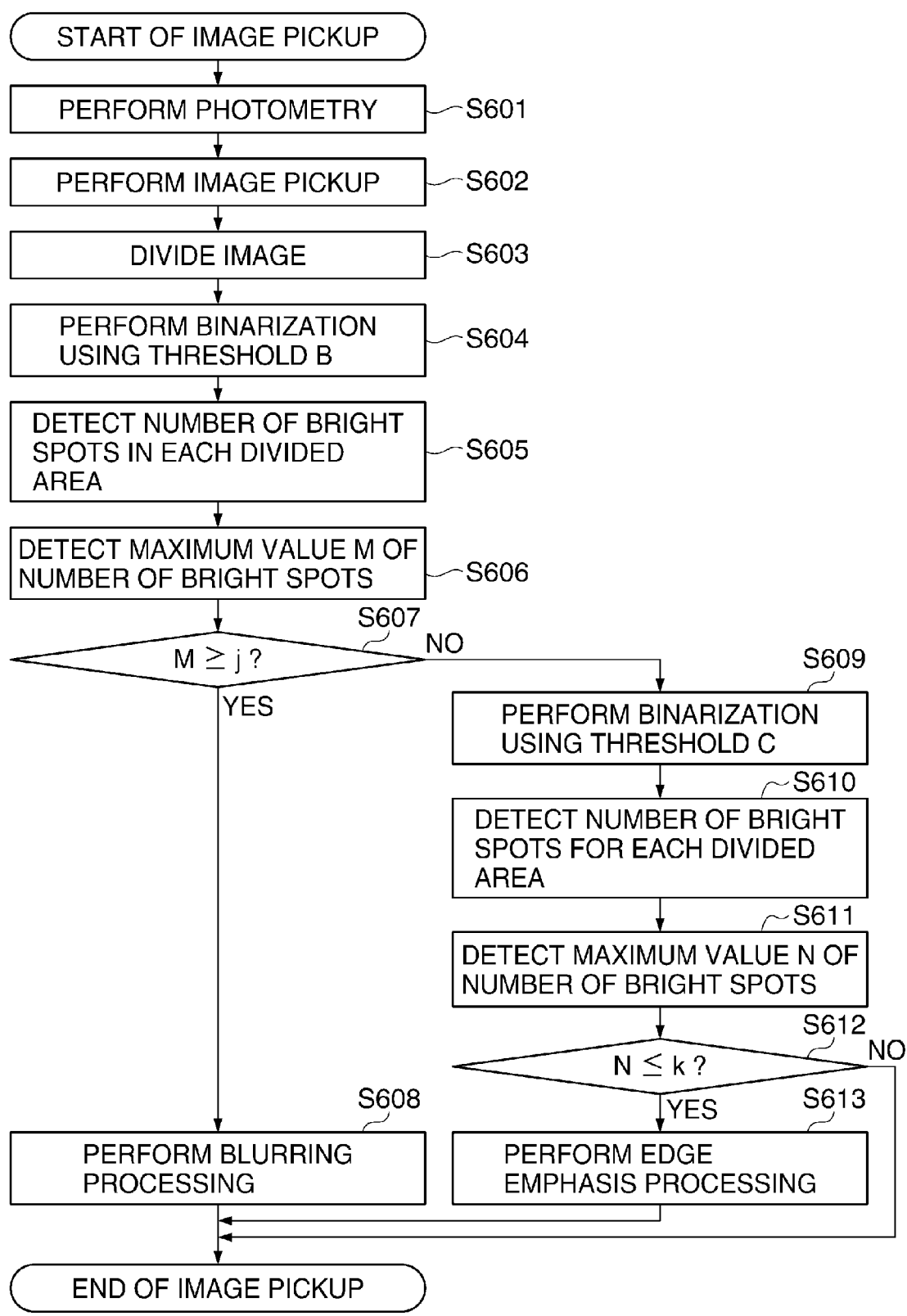
FIG. 6 is a flowchart of a second image pickup control process performed by the image pickup apparatus.

FIG. 6 is a flowchart of the second image pickup control process performed by the image pickup apparatus 100. Steps S601 to S603 are the same as the steps 401 to S403 of the process in FIG. 4, and hence description thereof is omitted. In a step S604, the emphasis processing determination circuit 306 causes the binarization processing circuit 300 to perform binarization processing on each divided area generated in the step S603 using a threshold value B which is a luminance level for binarization suitable for blurring processing. In a step S605, the emphasis processing determination circuit 306 causes the bright spot detection circuit 301 to detect the number of bright spots in each divided area. In a step S606, the emphasis processing determination circuit 306 detects the maximum value M of the numbers, detected in the step S605, of bright spots included in the plurality of divided areas.

In a step S607, the emphasis processing determination circuit 306 determines whether or not the maximum value M detected in the step S606 is not smaller than a predetermined value j suitable for blurring processing. If M j holds (YES to the step S607), the emphasis processing determination circuit 306 proceeds to a step S608, whereas if M<j holds (NO to the step S607), the emphasis processing determination circuit 306 proceeds to a step S609. In the step S608, the blurring processing circuit 304 of the image processor 120 performs blurring processing on the starry sky image obtained in the step S602, followed by terminating the present process.

Figure 7A:
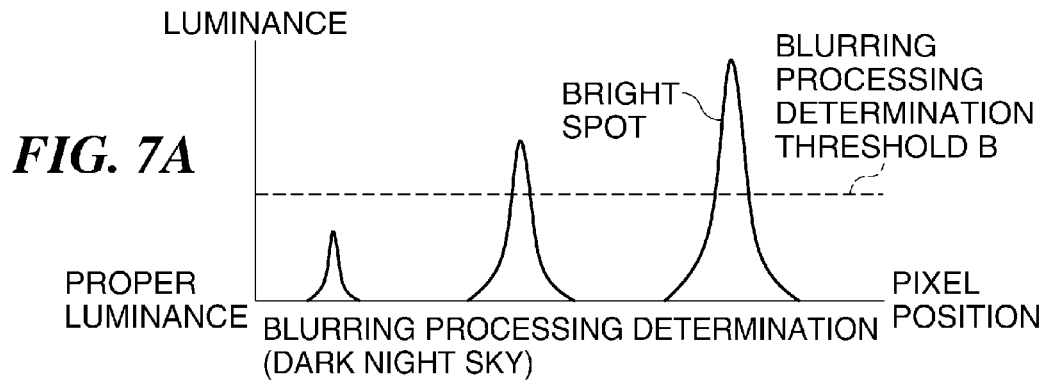
FIGS. 7A to 7D are schematic diagrams useful in explaining processing executed in steps of the process in FIG. 6, for selecting proper emphasis processing.
Figure 7B:
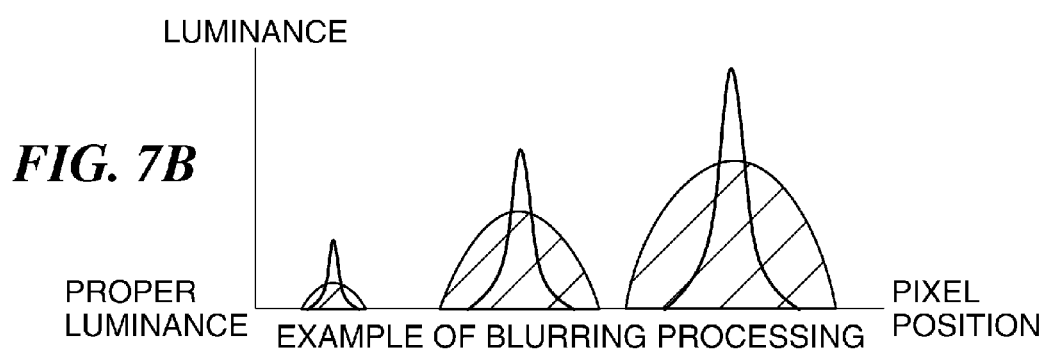

FIGS. 7A and 7B are schematic diagrams useful in explaining the steps S604 to S608. Blurring processing is suitable for the case described with reference to FIGS. 10A to 10C in which when the dark night sky is photographed, a large number of stars ranging from low-brightness stars to bright stars are included in the photographed image. Therefore, the threshold value B is set to such a value as will prevent low-brightness stars from being included in the number of bright spots detected in the step S605. If the number of bright spots thus detected is not smaller than the predetermined value j suitable for blurring processing, blurring processing for reducing the luminance and at the same time for spreading the corresponding area of pixels is performed on all bright spots in the starry sky area such that as a bright spot is brighter, the outline of the bright spot spreads into a surrounding area, as indicated by hatched areas in FIG. 7B. By performing the blurring processing, as a bright spot is brighter, the bright spot appears to be largely spread, which makes it possible to make bright stars conspicuous even when a large number of stars are included as bright spots in a starry sky image.

Referring again to FIG. 6, in the step S609, the emphasis processing determination circuit 306 performs binarization processing on each divided area generated in the step S603 using a threshold value C which is a luminance level for binarization suitable for edge emphasis processing. In a step S610, the emphasis processing determination circuit 306 causes the bright spot detection circuit 301 to detect the number of bright spots in each divided area. In a step S611, the emphasis processing determination circuit 306 detects the maximum value N of the numbers, detected in the step S610, of bright spots included in the divided areas.

In a step S612, the emphasis processing determination circuit 306 determines whether or not the maximum value N detected in the step S611 is not larger than a predetermined value k suitable for edge emphasis processing. If N≤k holds (YES to the step S612), the emphasis processing determination circuit 306 proceeds to a step S613, whereas if N>k holds (NO to the step S612), the present process is terminated. That is, if the number of bright spots detected using the threshold value B is smaller than the predetermined value j which is suitable for blurring processing and at the same time the number of bright spots detected using the threshold value C is larger than the predetermined value k which is suitable for edge emphasis processing, emphasis processing is not performed on the starry sky image obtained in the step S602. In the step S613, the edge emphasis processing circuit 303 of the image processor 120 performs edge emphasis processing on the starry sky image obtained in the step S602, followed by terminating the present process.

Figure 7C:
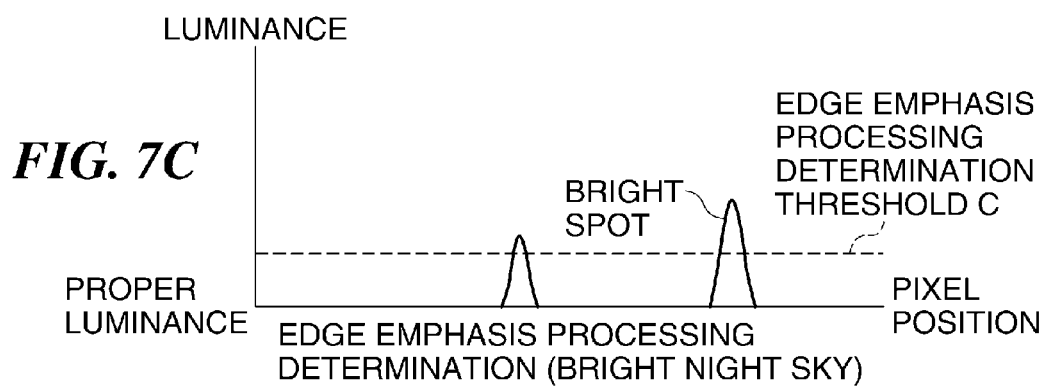
Figure 7D:
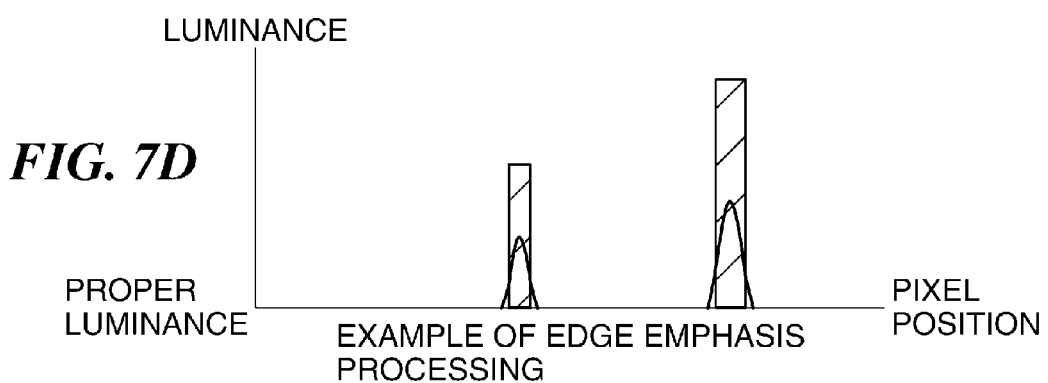

FIGS. 7C and 7D are schematic diagrams useful in explaining the steps S609 to S613. Edge emphasis processing is suitable for the case described with reference to FIG. 11A in which when the bright night sky is photographed, bright stars are included but very few low-brightness stars are included in the photographed image. In this case, the number of bright spots detected in the step S604 is less, and hence the answer to the question of the step S607 is negative (NO), so that the process proceeds to the step S609. As shown in FIG. 7C, the threshold value C is set to a value which will cause low-brightness stars as well to be included in the number of bright spots detected in the step S610. That is, the threshold value B used in the step S604 and the threshold value C used in the step S609 are set with a relationship of "threshold value B>threshold value C". If the number of detected bright spots is not larger than the predetermined value suitable for edge emphasis processing, processing for increasing the luminance and at the same time for narrowing the corresponding area of pixels is performed on all bright spots in the starry sky area, as indicated by hatched areas in FIG. 7D. This makes it possible to emphasize bright spots which are buried due to the low brightness thereof.

As described above with reference to FIGS. 4 and 7A to 7D, when photographing the starry sky, the image pickup apparatus 100 automatically determines a type of emphasis processing to be performed on a picked up starry sky image. This makes it possible to easily photograph a natural and impact-filled starry sky image in which the differences in brightness between bright stars and low-brightness stars are emphasized, regardless of the brightness of the night sky and the composition of the picked up image.

The method of determining the star emphasis processing described in the second image pickup control process performed by the image pickup apparatus 100 is a technique that is very effective in an area which is uniform in brightness of the sky (night sky) in a starry sky image. On the other hand, in a case where a starry sky image includes scenery, such as the moon, street lamps, and a streetscape, it is assumed that the brightness of the night sky is not uniform. However, even in the case where the brightness of the night sky is not uniform, by calculating an average luminance on a divided area-by-divided area basis, and performing binarization using a threshold value of the luminance suitable for emphasis processing on a divided area-by-divided area basis, it is possible to increase the accuracy of the star emphasis processing determination.

Further, a degree of emphasis of the emphasis processing may be automatically determined by setting more detailed conditions of the determination processing according to the brightness of the night sky and the number of stars having a luminance value not lower than a predetermined value. For example, the configuration may be such that in a case where the number of bright spots is smaller than a first predetermined value, the edge emphasis processing is more strongly performed than in a case where the number of bright spots is larger than the first predetermined value, and in a case where the number of bright spots is larger than a second predetermined value which is larger than the first predetermined value, the blurring processing is more strongly performed than in a case where the number of bright spots is smaller than the second predetermined value. Further, although as a method of detecting the number of bright spots, processing for binarizing a starry sky image using a predetermined threshold value is used, this is not limitative, but the bright spot may be detected using a well-known method for detecting bright spots from a starry sky image.

Further, although in the image pickup control process performed by the image pickup apparatus 100, binarization processing is performed using a predetermined threshold value for each star emphasis processing, the star emphasis processing method to be employed may be determined after converting the starry sky image into a multi-valued image using a plurality of threshold values. Further, although in the second image pickup control process performed by the image pickup apparatus 100, the image pickup operation is performed after AE processing is performed so as to perform photographing with proper exposure, a scene is envisaged in which photographing is performed with an exposure level which is different from proper exposure determined by the image pickup apparatus 100 e.g. due to exposure correction. In this case, it is only required that the threshold value for binarizing an image is changed in accordance with the corrected exposure.

In the second image pickup control process performed by the image pickup apparatus 100, the star emphasis processing is automatically determined for a picked-up starry sky image, and the determined processing is performed. However, this is not limitative, but a photographer may be enabled to determine whether or not to actually perform the determined star emphasis processing when the picked-up starry sky image is stored in the storage medium 200. Further, both of an image file on which the determined star emphasis processing has been performed and an image file on which the determined star emphasis processing has not been performed may be stored in the storage medium 200.

Next, the following description will be given of a third image pickup control process performed by the image pickup apparatus 100. The third image pickup control process is performed by the image pickup apparatus 100 when the celestial object (starry sky) photographing mode is set on the operation section 162. In the third image pickup control process performed by the image pickup apparatus 100, a plurality of starry sky images are picked up and synthesized to thereby generate one still image, whereby star trails are photographed.

Figure 8:
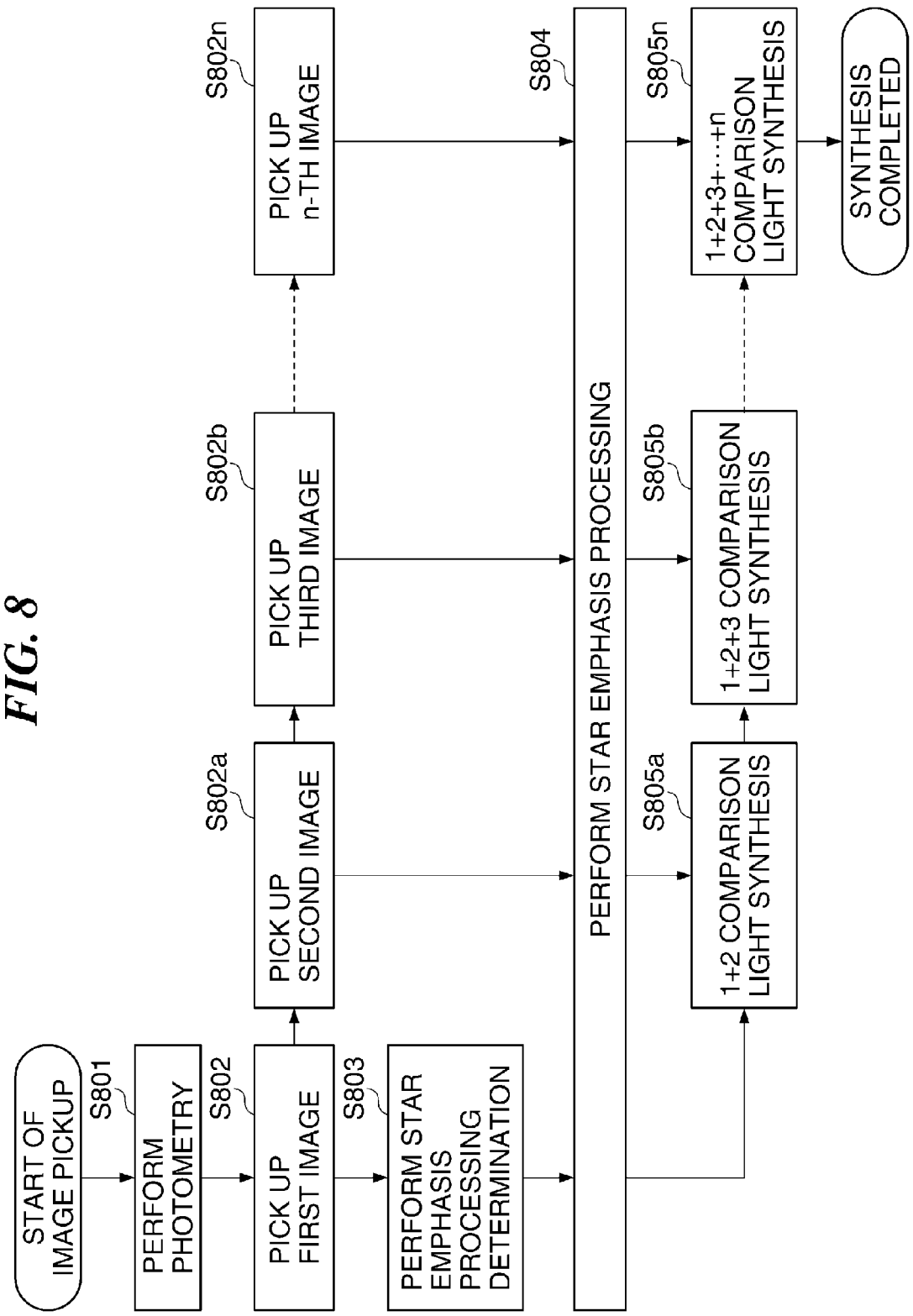
FIG. 8 is a flowchart of a third image pickup control process performed by the image pickup apparatus.

FIG. 8 is a flowchart of the third image pickup control process performed by the image pickup apparatus 100. A step S801 is the same as the step S201 of the process in FIG. 2, and hence description thereof is omitted. In a step S802, the system controller 150 determines a proper exposure level for photographing the starry sky based on a result of photometry in the step S801, and picks up a first image. Then, in a step S803, the emphasis processing determination circuit 306 determines a star emphasis processing method to be employed for the starry sky image acquired in the step S802 in a manner following the above-described second image pickup control process performed by the image pickup apparatus 100. In a step S804, the image processor 120 performs the star emphasis processing according to the star emphasis processing method determined in the step S803.

On the other hand, after execution of the step S802, the system controller 150 picks up a second image in a step S802*a*. Note that exposure conditions set for all image pickup operations including steps S802*b* to S802*n*, described hereinafter, for picking up the second and subsequent images are the same as the exposure conditions set for the image pickup operation for picking up the first image. The second starry sky image picked up in the step S802*a* is subjected to the same star emphasis processing as performed on the first starry sky image in the step S804. Further, in a step S805*a*, the comparison light synthesis circuit 305 performs comparison light synthesis of the first and second images subjected to the star emphasis processing.

A sequence of processing operations in the steps S802*a*, S804, and S805*a* are performed on predetermined n−1 starry sky images. That is, in the step S802*b* after the step S802*a*, the system controller 150 picks up a third image. Then, the third starry sky image picked up in the step S802*b* is subjected to the same star emphasis processing as performed on the first starry sky image in the step S804. Then, in a step S805*b*, the comparison light synthesis circuit 305 performs comparison light synthesis of the image generated in the step S805*a* and the third image subjected to the star emphasis processing.

After performing the same processing on a n−1th starry sky image, in the step S802*n*, the system controller 150 picks up an n-th image which is the last starry sky image. Then, the n-th starry sky image picked up in the step S802*n* is subjected to the same star emphasis processing as performed on the first starry sky image in the step S804. Further, in a step S805*n*, the comparison light synthesis circuit 305 performs comparison light synthesis of the image generated by comparison light synthesis based on the images up to the n−1-th image which have been subjected to the star emphasis processing, and the n-th image subjected to the star emphasis processing, followed by terminating the present process.

In the third image pickup control process performed by the image pickup apparatus 100, when moving bright spots are synthesized into trails in one image, it is possible to properly perform the emphasis processing with uniform width and brightness. Although in this description, the case where the number n of picked up images is practically equal to or larger than 4 has been described, the number n is only required to be an integer equal to or larger than 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although the image pickup apparatus 100 described in the embodiment is typically a digital still camera, the image pickup apparatus according to the present invention is not limited to this, but may be various electronic devices having a camera function, i.e. an image pickup function for acquiring an image using an image pickup device. For example, the image pickup apparatus 100 may be a portable communication terminal with the camera function (such as a mobile phone and a smartphone), a portable computer with the camera function (tablet terminal), or a portable game player with the camera function. Further, an image pickup unit configured to perform image pickup and an image processing unit configured to perform image processing on an image picked up by the image pickup unit may be separately provided, and these units may be connected in such a manner that data communication can be performed by wire communication or wireless communication.

Further, the image processing method according to the present invention can also be executed by e.g. a computer without the camera function. Further, the image processing method according to the present invention is not necessarily required to be executed on a real-time basis in photographing, but can also be executed later using RAW data of a picked-up image stored in a predetermined storage medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-215434 filed Oct. 22, 2014, which is hereby incorporated by reference herein in its entirety.

What is claimed is:

1. An image processing apparatus comprising:
a bright spot detection unit configured to detect the number of bright spots from an image picked up by an image pickup unit;
a blurring processing unit configured to perform blurring processing on the image picked up by the image pickup unit;
an edge emphasis processing unit configured to perform edge emphasis processing on the image picked up by the image pickup unit; and
a control unit configured to control the image processing performed on the image by selecting the blurring processing, or the edge emphasis processing, or neither of the two according to the number of bright spots detected by said bright spot detection unit.

2. The image processing apparatus according to claim 1, wherein in a case where the number of bright spots is not smaller than a first predetermined value, said control unit controls the image processing such that the blurring processing is performed on the image picked up by the image pickup unit.

3. The image processing apparatus according to claim 1, wherein in a case where the number of bright spots is not larger than a second predetermined value, said control unit controls the image processing such that the edge emphasis processing is performed on the image picked up by the image pickup unit.

4. The image processing apparatus according to claim 1, wherein said control unit controls the image processing performed on the image picked up by the image pickup unit such that the blurring processing is performed in a case where the number of bright spots is not smaller than a first predetermined value, the edge emphasis processing is performed in a case where the number of bright spots is not larger than a second predetermined value, and neither the blurring processing nor the edge emphasis processing is performed in a case where the number of bright spots is smaller than the first predetermined value and larger than the second predetermined value.

5. The image processing apparatus according to claim 1, wherein said bright spot detection unit detects the number of bright spots from each of a plurality of image areas generated by dividing the image picked up by the image pickup unit.

6. The image processing apparatus according to claim 1, comprising a binarization unit configured to binarize the image picked up by the image pickup unit using a predetermined threshold value, and
wherein said bright spot detection unit detects the number of bright spots from the image binarized by said binarization unit.

7. The image processing apparatus according to claim 6, comprising a dividing unit configured to divide the image picked up by the image pickup unit into a plurality of image areas,
wherein said binarization unit performs binarization processing using the predetermined threshold value for each of the plurality of image areas divided by said dividing unit,
wherein said bright spot detection unit identifies the maximum value of the number of bright spots detected from each of the plurality of image areas subjected to the binarization processing, and
wherein said control unit controls the image processing based on the maximum value of the number of bright spots.

8. The image processing apparatus according to claim 1, wherein the bright spots are images associated with pixel values each having a luminance value which is not smaller than a predetermined value.

9. The image processing apparatus according to claim 1, wherein the number of bright spots is the number of bright spots per unit area in the image.

10. The image processing apparatus according to claim 1, comprising a synthesis unit configured to compare pixel levels of pixels at respective corresponding positions in a plurality of images picked up by the image pickup unit with each other to select only a pixel having the highest level, and synthesize thus selected pixels into one image, and
wherein said control unit controls the same image processing as performed on the first image picked up by the image pickup unit to be performed on second and subsequent images picked up by the image pickup unit, and
wherein said synthesis unit synthesizes the first image subjected to the image processing, and the second and subsequent images subjected to the same image processing as performed on the first image.

11. An image processing apparatus comprising:
a bright spot detection unit configured to detect the number of bright spots from an image picked up by an image pickup unit;
an edge emphasis processing unit configured to perform edge emphasis processing on the image picked up by the image pickup unit; and
a control unit configured to control the image processing performed by said edge emphasis processing unit,
wherein said control unit controls the edge emphasis processing perforated on the image picked up by the image pickup unit by said edge emphasis processing unit according to the number of bright spots detected by said bright spot detection unit;
wherein in a case where the number of bright spots is smaller than a first determined value, said control unit more strongly performs the edge emphasis processing than in a case where the number of bright spots is larger than the first predetermined value.

12. The image processing apparatus according to claim 11, further comprising a blurring processing unit configured to perform blurring processing on the image picked up by the image pickup unit, wherein in a case where the number of bright spots is larger than a second predetermined value, said control unit more strongly performs the blurring processing on the image picked up by the image pickup unit than in a case where the number of bright spots is smaller than the second predetermined value.

13. The image processing apparatus according to claim 12, wherein the second predetermined value is larger than the first predetermined value.

14. An image processing method performed by a computer, comprising:

detecting the number of bright spots from an image;
perform blurring processing on the image;
performing edge emphasis processing on the image; and
controlling the image processing performed on the image by selecting the blurring processing, or the edge emphasis processing, or neither of the two according to the number of bright spots detected by said detecting.

15. An image processing method performed by a computer, comprising:

performing, on an image, binarization processing using a first threshold value, and binarization processing using a second threshold value which is smaller than the first threshold value;
detecting the number of bright spots on the image subjected to the binarization processing using the first threshold value as a first number of bright spots, and the number of bright spots on the image subjected to the binarization processing using the second threshold value as a second number of bright spots, respectively; and
controlling image processing performed on the image according to the first number of bright spots and the second number of bright spots,
wherein said controlling includes controlling, according to the first number of bright spots and the second number of bright spots, whether to perform blurring processing or edge emphasis processing as the image processing or neither the blurring processing nor the edge emphasis processing.

16. A non-transitory computer-readable storage medium storing a computer-executable program for executing an image processing method, wherein the image processing method comprises:
detecting the number of bright spots from an image;
perform blurring processing on the image;
performing edge emphasis processing on the image; and
controlling the image processing performed on the image by selecting the blurring processing, or the edge emphasis processing, or neither of the two according to the number of bright spots detected by said detecting.

17. A non-transitory computer-readable storage medium storing a computer-executable program for executing an image processing method, wherein the image processing method comprises:

performing, on an image, binarization processing using a first threshold value, and binarization processing using a second threshold value which is smaller than the first threshold value;
detecting the number of bright spots on the image subjected to the binarization processing using the first threshold value as a first number of bright spots, and the number of bright spots on the image subjected to the binarization processing using the second threshold value as a second number of bright spots, respectively; and
controlling image processing performed on the image according to the first number of bright spots and the second number of bright spots,
wherein said controlling includes controlling, according to the first number of bright spots and the second number of bright spots, whether to perform blurring processing or edge emphasis processing as the image processing or neither the blurring processing nor the edge emphasis processing.

* * * * *